(12) United States Patent
Hanser et al.

(10) Patent No.: US 7,419,202 B1
(45) Date of Patent: Sep. 2, 2008

(54) SEAL FOR EXPANDABLE ROOMS

(75) Inventors: Paul E. Hanser, Tipton, IA (US);
Vincent Buls, Tipton, IA (US)

(73) Assignee: HWH Corporation, Moscow, IA (US)

( * ) Notice: Subject to any disclaimer, the term of this patent is extended or adjusted under 35 U.S.C. 154(b) by 360 days.

(21) Appl. No.: 11/164,521

(22) Filed: Nov. 28, 2005

(51) Int. Cl.
*B60J 7/00* (2006.01)
(52) U.S. Cl. ............... 296/26.13; 296/26.01; 52/67
(58) Field of Classification Search ........... 296/26.01, 296/26.02, 26.03, 26.04, 26.05, 26.07, 26.08, 296/26.09, 26.1, 26.11, 26.12, 26.13, 26.14, 296/26.15, 171, 165, 172, 173, 176; 52/67; 49/475.1, 498.1
See application file for complete search history.

(56) References Cited

U.S. PATENT DOCUMENTS 5,237,782 A * 8/1993 Cooper ..................... 52/67
6,966,590 B1 * 11/2005 Ksiezopolki et al. ..... 296/26.01

\* cited by examiner

*Primary Examiner*—Joseph D Pape
(74) *Attorney, Agent, or Firm*—James C. Nemmers

(57) ABSTRACT

A seal assembly primarily for recreational vehicles that have an expandable room. The seal assembly seals the opening in a fixed wall of the vehicle through which the expandable room extends. The seal assembly includes a retainer that is attached to a fixed wall of the vehicles, the retainer holding a bulb-type seal properly in place. The retainer securely holds the bulb seal in place until it is compressed by the expandable room, and the retainer further functions to prevent the bulb seal from being crushed which could cause premature failure of the seal. The seal assembly also provides for relative movement in different directions between the meeting surfaces of the fixed room and moveable room. In this way, it acts as a low friction bearing surface while still maintaining a complete and positive seal at all times.

7 Claims, 3 Drawing Sheets

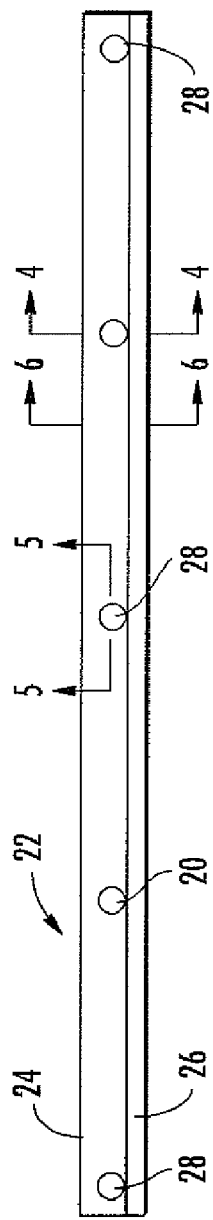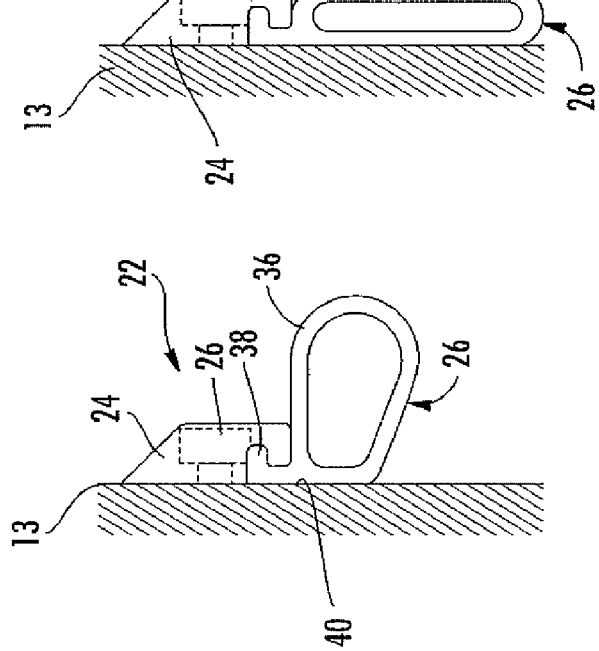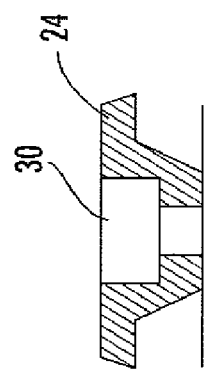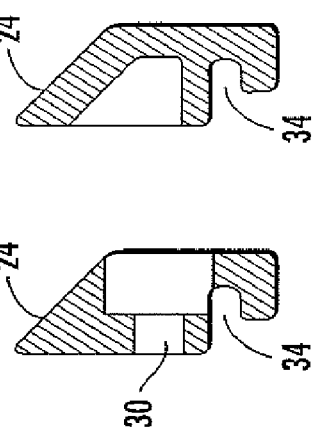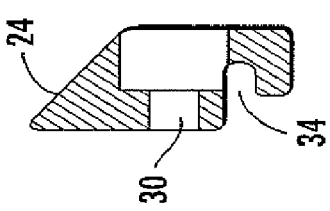

SEAL FOR EXPANDABLE ROOMS

BACKGROUND OF THE INVENTION

This invention relates generally to expandable rooms, and more particularly to room structures that are moveable between retracted and expanded positions. The invention particularly relates to vehicles such as recreational vehicles that are provided with one or more expandable room or room portions that are capable of moving from a retracted position to an expanded position to provide additional internal space. Typically, one portion of the room is nested within a portion of an existing room of the vehicle that remains fixed. Although similar structures can be used effectively in static structures, the description and disclosure focuses primarily on such rooms that are used in vehicles.

As is well known to those skilled in the art, when a recreational vehicle equipped with an expandable room is in motion, the room typically remains in a retracted position. This is necessary in order for the vehicle to move over the road and remain within vehicle width limitations. However, when the vehicle is stopped for a period of time, it is often desirable to increase the size of the internal accommodations, and in order to do so the user will cause the moveable portion of the room to move outwardly to an expanded position.

The prior art discloses various structures for moving the room from a retracted to an expanded position and returning the room to the retracted position where it is typically held in place. Because such rooms, especially those used in vehicles, are exposed to a variety of weather conditions, it is necessary to provide a proper, weather-tight seal between the moveable room structure and the fixed structure from which the room expands and retracts. These seals are subjected to considerable force and must seal against movement in both a horizontal and a vertical direction since there can be slight movement between the expandable room and the fixed structure even when the room is retracted and held in a retracted position. The expandable rooms are typically quite large and heavy and exert considerable force and can move vertically even when in the retracted position due to forces that occur when the vehicle is driven over the road. In addition, some of the mechanisms for moving the room from a retracted to an expanded position move the room downwardly as it is expanded so that the floor of the expanded room will be level with the floor of the fixed structure. This is commonly referred to as the 'level out' feature. As the expandable room is retracted or expanded, there is some vertical movement between the expandable room and the fixed structure of the vehicle as the moveable room engages the seals between the fixed structure and the moveable room structure.

It is therefore the principle object of the invention to provide an improved seal between the expandable room and the fixed structure under all anticipated conditions and forces that may be exerted between the structures.

SUMMARY OF THE INVENTION

The invention comprises a seal assembly that includes a retainer that is attached to the fixed wall and which retainer holds a bulb-type seal properly in place. The retainer securely holds the bulb seal in place until it is compressed by the moveable room, and the retainer further functions to prevent the bulb seal from being crushed which could cause premature failure of the seal. The seal assembly also provides for relative movement in different directions between the meeting surfaces of the fixed room and moveable room. In this way, it acts as a low friction bearing surface while still maintaining a complete and positive seal at all times.

BRIEF DESCRIPTION OF THE DRAWINGS

FIG. 3 is an elevational view of the seal assembly;

FIG. 4 is a sectional view taken on the line 4-4 of FIG. 3;

FIG. 5 is a sectional view taken on the line 5-5 of FIG. 3;

FIG. 6 is a sectional view taken on the line 6-6 of FIG. 3;

FIG. 7 is an end view of the seal assembly showing the seal in a non-sealing condition;

FIG. 8 is an end elevational view of the seal assembly illustrating the seal in a collapsed or sealing condition;

DESCRIPTION OF THE PREFERRED EMBODIMENTS OF THE INVENTION

Figure 1:
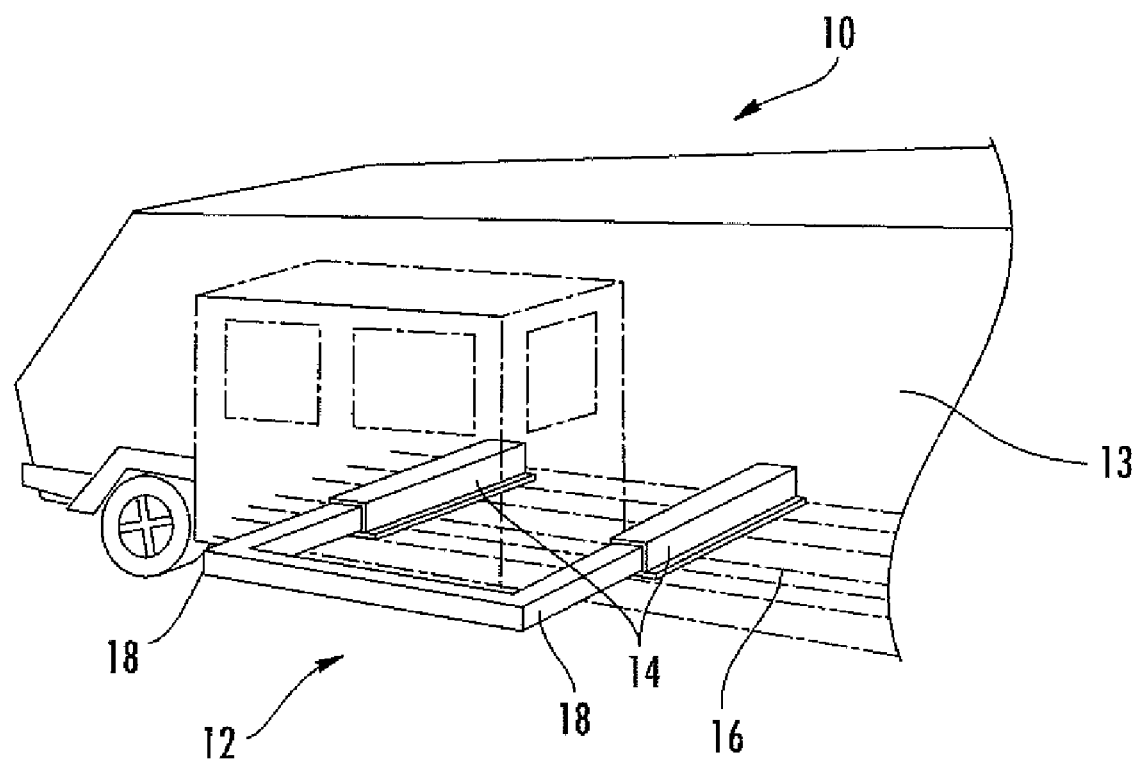
FIG. 1 is a schematic perspective view to illustrate generally an expandable room combined with a vehicle.
Figure 2:
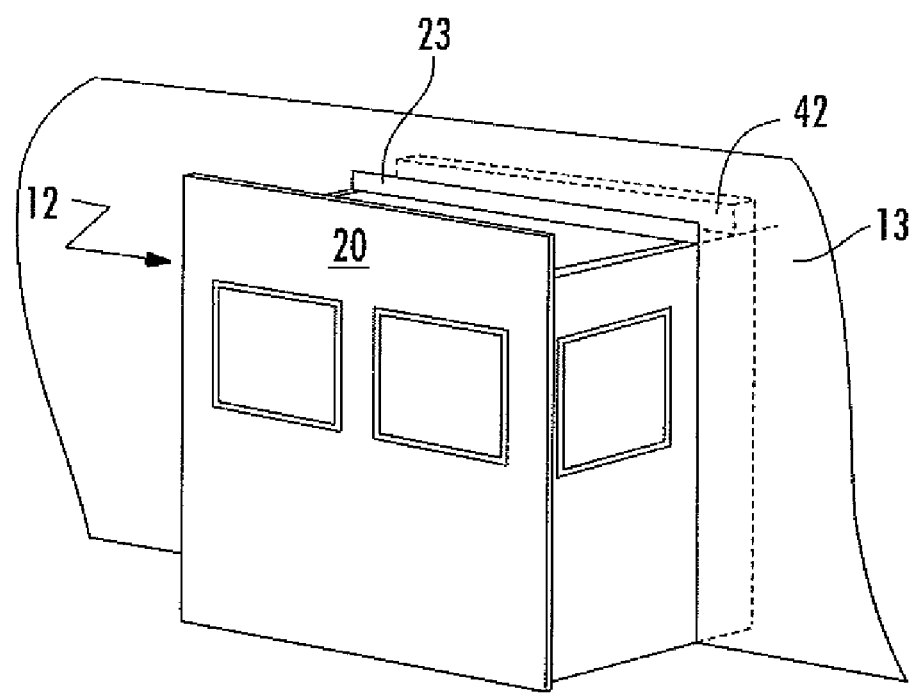
FIG. 2 is an enlarged perspective view showing the expandable room in an expanded position to illustrate the mounting position of a seal assembly.

Referring first to FIGS. 1 and 2, there is illustrated a recreational vehicle 10 having an expandable and retractable room 12 moveable into and out from one side 13 of the recreational vehicle 10. As is well known to those skilled in the art, there are a variety of systems and mechanisms for moving the room 12, and FIG. 1 illustrates a typical structure that includes beams 14 which extend laterally and are supported by the frame 16 of the recreational vehicle 10. The expandable room 12 has structural supports 18 that are supported by and move relative to the beams 14 on the recreational vehicle. In FIG. 2, the expandable room 12 is shown in an expanded position with the outside wall 20 spaced from the side wall 13 of the recreational vehicle 10. FIG. 2 also illustrates a typical location 23 of a seal assembly, which assembly is indicated generally by the reference numeral 22 in FIGS. 3 and 7. As shown in FIG. 2, the location 23 of the seal assembly 22 could be along the outside of the side wall 13 around the top edge of the opening through which the room 12 extends. It should be understood that additional seal assemblies 22 may also be located along the vertical edges of the side wall 13 to provide a complete weather-tight seal around the opening through which the expanded room 12 extends. In addition, as described herein after with reference to FIGS. 9 and 10, the seal assembly 22 may be positioned on the side wall 13 inside the vehicle where the vehicle utilizes a 'level out' feature in which the expandable room 12 drops downwardly as it extends so that floors of the vehicle 10 and room 12 will be level when the room 12 is fully extended. The seal assembly 22 of the invention will now be described in detail with reference to FIGS. 3-8.

The seal assembly includes a retainer 24 that holds a bulb seal 26 in place and also serves as a bumper to prevent the bulb seal 26 from being crushed which could cause premature failure. The retainer 24 is used to attach the seal assembly 22 to the side wall 13 or other surface where a seal is desired or necessary. The retainer 24 may be attached to the wall 13 by use of an adhesive, but also is attached by rivets or screws 28 which are received in corresponding openings 30 spaced apart along the retainer 24. The retainer is formed from any suitable material, such as a high density polyethylene, and the retainer 24 is formed with a retaining groove 34 that extends the full length of the retainer 24. The bulb seal 26 has a main hollow body 36 and a retention tongue 38 formed integrally with the main body 36. The retention tongue 38 has the same cross section as the retaining groove 34 of the retainer 24 so that it will nest in the retaining groove 34 and be held by the retainer 24 against the wall 13. The bulb seal 26 may also be provided with an adhesive backing along the back wall 40 of the main body 36 to assist in attaching the bulb seal 26 and holding it in place on the wall 13.

Figure 9:
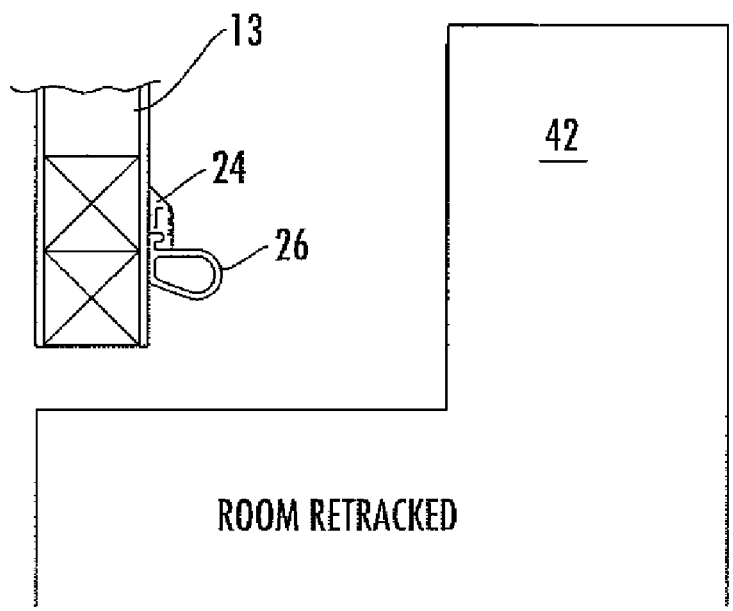
FIG. 9 is an end view illustrating the seal position and engagement for use in a level out room application and showing the room in a retracted position.
Figure 10:
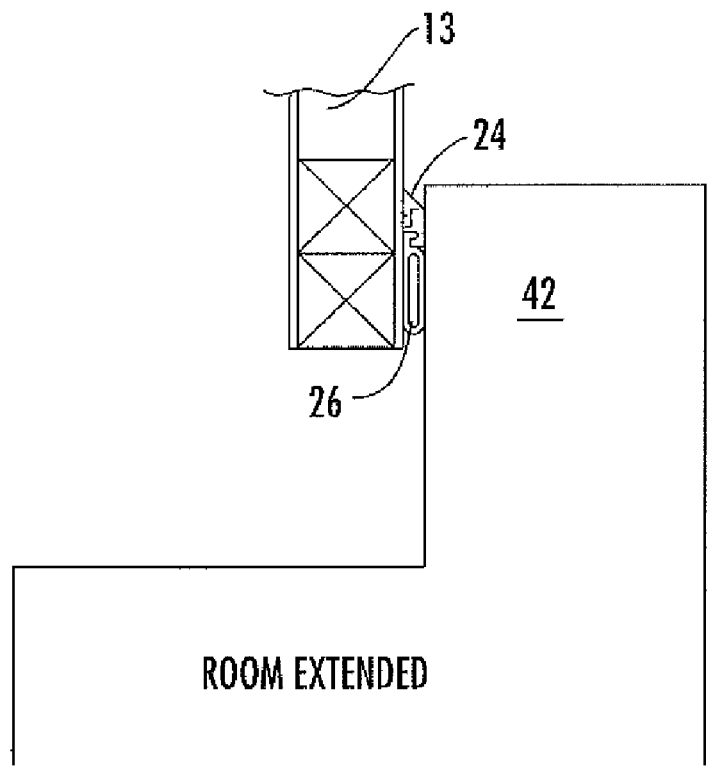
FIG. 10 is an end view illustrating the seal position and engagement for use in a level out room application and showing the room in an expanded position.

FIG. 7 is an end view of the seal assembly 22 mounted on the wall 13 showing the seal assembly 22 in an uncollapsed position in which it is not creating a seal between two structures. FIG. 8 is a view similar to FIG. 7 but showing the bulb seal 26 compressed by the meeting surface of the outside wall 20 of the expandable room 12. Note from FIG. 8 that when the meeting surface of the outside wall 20 engages the seal assembly 22, it will compress the bulb seal 26 until the wall 20 makes contact with the retainer 24. Thus, the retainer 24 serves to prevent the bulb seal 26 from being completely crushed which could cause premature failure of the seal. It will also be evident from FIG. 8 that when the bulb seal 26 is compressed between the wall 13 and wall 20, the sealing surfaces provided by the bulb seal 26 are significantly expanded to provide a more extensive sealed surface. In addition, the retainer 24 provides an additional function in that it allows the wall 20 of the expandable room 12 to move in the direction of the arrow "A" of FIG. 8 and thus serves as a low friction bearing surface to permit a certain amount of this type of movement while still maintaining a complete seal between the walls 13 and 20. This is important in applications where expandable rooms are used in recreation or other vehicles since it is virtually impossible to completely prevent movement between the walls 13 and 20 in the direction of arrow "A" of FIG. 8. With the seal assembly of the invention, such movement can occur without breaking the seal between the two walls. This advantage of the seal assembly of the invention is especially useful in those applications where there is movement not only in the direction of the arrow "B" of FIG. 8, but also in the direction of the arrow "A" of FIG. 8, such as occurs in a 'level out' application. FIGS. 9 and 10 illustrate the positioning of the seal assembly in such an application.

FIGS. 9 and 10 illustrate schematically the expandable room 12 in retracted and extended positions with the seal assembly 22 mounted on an inside surface of the vehicle wall 13 and thus inside the vehicle. This positioning of the seal is used primarily when the recreational vehicle 10 is provided with the 'level out' feature. In this application, the expandable room is provided at its inner end with an outwardly extending flange 42. In FIG. 10, flange 42 is show extending upwardly, but it should be understood that the flange can extend outwardly in any direction where a seal is required. As the room 12 moves outwardly and nears its fully extended position, the room 12 starts to drop downwardly after the flange 42 engages and compresses the bulb seal 26. As the room 12 drops, the flange 42 will slide down the retainer 24 while maintaining compression of the seal 26 until the room 12 is level with the floor of the vehicle 10 and fully extended, as illustrated in FIG. 10. Then, when the room 12 is retracted, the flange 42 will initially slide up the retainer 24 while maintaining contact with the compressed seal 26 after which the room 12 moves horizontally until it is fully retracted as illustrated in FIG. 9.

Having thus described the invention in connection with the preferred embodiments of the invention, it will be evident to those skilled in the art that various revisions and modifications can be made to the specific embodiment described herein without departing from the spirit and scope of the invention. It is our invention, however, that all such revisions and modifications that are obvious to those skilled in the art will be included within the scope of the following claims.

What is claimed is:

1. A seal assembly for sealing the opening between a fixed structure and a moveable structure that moves outwardly from the fixed structure to an extended position and moves inwardly to a retracted position, said seal assembly comprising:
    a retainer positioned between the fixed structure and the moveable structure in the area to be sealed and adapted to be attached to the fixed structure or the moveable structure so that the retainer will be engaged between the structures as they move toward each other;
    the retainer having a groove opening toward the structure to which it is attached;
    a bulb seal having a retention tongue received in the retainer groove so as to be combined with and held in place by the retainer, the seal extending along and outwardly from the retainer so that the seal will be compressed between the fixed and moveable structures;
    the thickness of the retainer being greater than the thickness of the bulb seal when the seal is completely compressed,
    whereby compression of the bulb seal provides a positive seal between the fixed and moveable structures while the retainer limits the compression of the bulb seal to prevent damage to the bulb seal.

2. The seal assembly of claim 1 in which the retainer is attached to the fixed structure.

3. The seal assembly of claim 2 in which the fixed structure is a wall of a recreational vehicle having an outside surface and an inside surface, and the moveable structure is an expandable room having an outer end and an inner end, the outer end having an inside surface and an outside surface which is normally substantially flush with the outside surface of the wall, the expandable room being moveable outwardly from a retracted position flush with the wall to an extended position away from the wall.

4. The seal assembly of claim 3 in which the retainer is attached to the outside surface of the wall of the recreational vehicle and the seal assembly is engaged by the inside surface of the outer end of the expandable room to seal the expandable room and the wall of the recreational vehicle when the expandable room is fully retracted.

5. The seal assembly of claim 4 in which the retainer is attached to the inside surface of the wall of the recreational vehicle, and the expandable room has an outwardly extending flange at its inner end, which flange has an outer surface and an inner surface, and the seal assembly is engaged by the outer surface of the flange when the expandable room is fully extended.

6. A seal assembly for sealing the opening between a fixed structure and a moveable structure that moves outwardly from the fixed structure to an extended position and moves inwardly to a retracted position, said seal assembly comprising:
    a retainer positioned between the fixed structure and the moveable structure in the area to be sealed and adapted to be attached to the fixed structure or the moveable structure so that the retainer will be engaged between the structures as they move toward each other; and a bulb seal combined with and held in place by the retainer, the seal extending along and outwardly from the retainer so that the seal will be compressed between the fixed and moveable structures;

the retainer having a flat surface extending generally transverse to the direction of movement between the structures so as to provide for limited transverse movement between the structures without breaking the seal provided by the bulb seal, whereby compression of the bulb seal provides a positive seal between the fixed and moveable structures while the retainer limits the compression of the bulb seal to prevent damage to the bulb seal.

7. The seal assembly of claim 6 in which the retainer has a groove extending along its length and the bulb seal has a retention tongue received in the groove to hold the bulb seal in place.

* * * * *